400-691 SR
OR X 5,581
5581X
W. A. BURT.
TYPOGRAPHER.
Patented July 23, 1829.
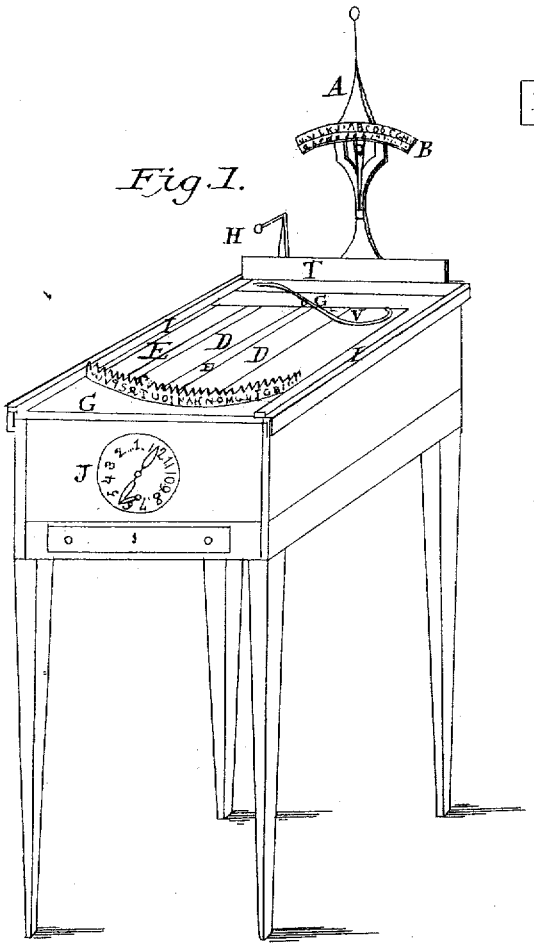
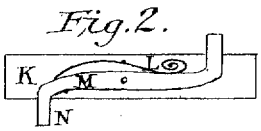
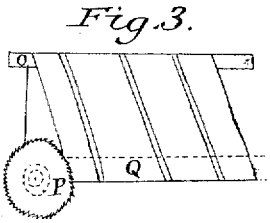
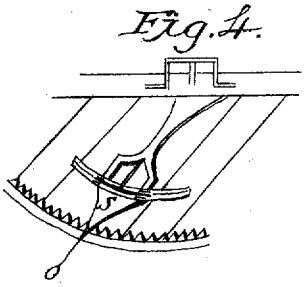

W. A. Burt, July 23, 1829.

This patent discloses the actual construction of a type writing machine for the first time in any country.

The type are arranged on the under side of a segment carried by a lever pivoted to swing vertically and horizontally.

The desired character is brought to the printing point by moving this lever horizontally to a position over the same character in the index, and the impression is made by then depressing the lever.

Several styles of type may be used and they are arranged in two rows on the lever; these rows of type can be shifted on the lever to bring either one to the printing point.

The paper is carried on an endless band which travels crosswise of the machine, and this band is moved for letter space by the impression lever every time said lever is depressed to print.

The line space is made by shifting the frame carrying the printing mechanism towards the front or rear of the machine, the paper remaining stationary.

Ink-pads are located at each side of the impression point, and all the type except the one in printing position are inked every time the impression lever is depressed.

A dial is provided which indicates the length of paper in inches which has passed the printing point in printing each line, and as the operator knows the width of the paper being used the time to stop printing at the end of the line is indicated.

The United States of America

TO ALL TO WHOM THESE Letters Patent SHALL COME:

Whereas *William A. Burt A Citizen of*

*the United States hath alleged that he has invented a new and useful improvement*

*being a machine for printing, styled by him the "Typograph"*

*which improvement he states has not been known or used before his application, hath made oath that he does verily believe that he is the true inventor or discoverer of the said improvement, hath paid into the treasury of the United States the sum of thirty dollars, delivered a receipt for the same, and presented a petition to the Secretary of State signifying a desire of obtaining an exclusive property in the said improvement, and praying that a patent may be granted for that purpose.* These are therefore *to grant, according to law, to the said Wm. A. Burt his heirs, administrators or assigns, for the term of fourteen years from the twenty third day of July one thousand eight hundred and twenty nine, the full and exclusive right and liberty of making, constructing, using and vending to others to be used, the said improvement, a description whereof is given in the words of the said Wm. A. Burt himself in the schedule herein annexed, and to make a part of these presents.*

In Testimony whereof, I have caused these Letters to be made Patent, and the Seal of the United States to be hereunto affixed.

GIVEN under my hand, at the City of Washington, this twenty third day of July in the year of our Lord one thousand eight hundred and twenty nine, and of the independence of the United States of America the fifty fourth.

Andrew Jackson

BY THE PRESIDENT:

M Van Buren Secretary of State.

City of Washington TO WIT:

I DO HEREBY CERTIFY, That the foregoing Letters Patent were delivered to me on the twenty third day of July in the year of our Lord one thousand eight hundred and twenty nine to be examined; that I have examined the same, and find them conformable to law; and I do hereby return the same to the Secretary of State within fifteen days from the date aforesaid, to wit, on this twenty third day of July in the year aforesaid.

No. 185.

Wm. Wirt Attorney General of the United States.